United States Patent
Ohkido et al.

(10) Patent No.: US 7,022,257 B1
(45) Date of Patent: Apr. 4, 2006

(54) COATING COMPOSITION AND FLOOR MATERIAL COATED WITH SAID COMPOSITION

(75) Inventors: Masaji Ohkido, Wakayama (JP); Yoji Tominaga, Tsushima (JP); Ryo Imami, Tsushima (JP)

(73) Assignees: Shin-Nakamura Chemical Co., Ltd., Wakayama (JP); GEN Maintenance Technology Inc., Tsushima (JP)

( * ) Notice: Subject to any disclaimer, the term of this patent is extended or adjusted under 35 U.S.C. 154(b) by 1193 days.

(21) Appl. No.: 09/686,500

(22) Filed: Oct. 11, 2000

(30) Foreign Application Priority Data

| Jun. 15, 2000 | (JP) | ............................ 2000/180093 |
| Sep. 28, 2000 | (JP) | ............................ 2000/296173 |

(51) Int. Cl.
*C09K 3/00* (2006.01)
*C08L 75/14* (2006.01)
*C08L 75/16* (2006.01)
*C08F 299/06* (2006.01)
*C08F 8/30* (2006.01)

(52) U.S. Cl. ............................ 252/182.21; 252/182.2; 252/182.27; 252/182.28; 252/182.24; 525/455; 525/123; 524/590

(58) Field of Classification Search ............... 252/182.2
See application file for complete search history.

(56) References Cited

U.S. PATENT DOCUMENTS

| 4,060,506 | A | | 11/1977 | Verbanac |
| 4,608,400 | A | * | 8/1986 | Yokoshima et al. .......... 522/96 |
| 5,516,546 | A | * | 5/1996 | Hari et al. ................... 427/122 |
| 5,650,263 | A | * | 7/1997 | Wakata et al. ............ 430/281.1 |
| 6,225,376 | B1 | * | 5/2001 | Klein et al. .................. 523/404 |
| 6,245,835 | B1 | * | 6/2001 | Klein et al. .................. 523/402 |
| 6,372,340 | B1 | * | 4/2002 | Tominaga et al. .......... 428/352 |
| 6,596,445 | B1 | * | 7/2003 | Matsumoto et al. ........... 430/7 |

FOREIGN PATENT DOCUMENTS

GB 2 307 912 A 6/1997

OTHER PUBLICATIONS

Esp@cenet Patent Abstract: JP 60 021628 B (Apr. 3, 1979).
Inpadoc Patent Abstract: JP 52 016586 A2 (Feb. 7, 1977).
Derwent Patent Abstract: JP 80 015494 B (Apr. 24, 1980).
Derwent Patent Abstract: JP 76 024368 B (Jul. 23, 1976).
Inpadoc Patent Abstract: JP 52 112698 A2 (Sep. 21, 1977).
Patent Abstracts of Japan: JP 05 019102 A (Jan. 29, 1993).
Dialog Patent Abstract: JP 20 00104016 A (Apr. 11, 2000).

* cited by examiner

*Primary Examiner*—Joseph D. Anthony
(74) *Attorney, Agent, or Firm*—Leydig, Voit & Mayer, Ltd.

(57) ABSTRACT

A floor coating composition containing one or more unsaturated urethane compounds, which is(are) obtained from an isocyanate compound(s) and a hydroxyl compound(s) as starting materials, wherein at least one of the isocyanate compound(s) and the hydroxyl compound(s) has an unsaturated bond(s), wherein the poly(alkyleneoxy) group content (as defined in the specification) is 2–16 wt % and the proportion of the number of the unsaturated bonds (as defined in the specification) is not less than 6, can form a coating film superior in staining resistance against extremely powerful staining substances and gloss retentivity against extremely great load from walking, and which permits easy polishing away of damages and color stain, as well as use of water as a solvent. When a coating object is covered with a film made from the composition, a coated material can be obtained, wherein warpage of a coating object (floor, floor material, plastic film and the like) and cracks in the film are suppressed.

17 Claims, No Drawings

COATING COMPOSITION AND FLOOR MATERIAL COATED WITH SAID COMPOSITION

TECHNICAL FIELD OF THE INVENTION

The present invention relates to a floor coating composition and a composition-coated material. More particularly, the present invention relates to a floor coating composition capable of forming a coating film superior in gloss retentivity and staining resistance, wherein the film enables easy removal of damages and color stain, which composition permits the use of water as a solvent, and to a composition-coated floor material which comprises a coating object and a film formed by curing the floor coating composition.

BACKGROUND OF THE INVENTION

The conventional floor materials for fast-food shops, convenience stores, department stores, gyms, hospitals, offices, houses, factories and the like include i) resin tiles and sheets of, for example, vinyl chloride, ii) wooden materials such as flooring, iii) ceramic materials such as magnetic tiles, iv) stone materials such as marble, v) concrete materials such as mortar, and vi) coated floor materials made by forming a coating film on the floor materials of the above-mentioned i)-v). These floor materials can be used as they are, but generally, a lustering agent such as wax, floor-polish and the like is applied onto the surface of the floor materials, thereby to impart high glossiness to the surface, to improve durability by preventing degradation of the floor materials, and to impart walking suitability by preventing slipping thereon.

When such conventional lustering agent is applied onto the floors for the places where quite a number of customers visit, such as the floor of fast-food shops, the floor surface usually loses surface glossiness to a considerable degree and the damages and color stain due to the soil and sand, edible oil such as lard, process oils contained in the rubber constituting the bottom of shoes, and the like become conspicuous in a several days to one week from the application. To deal with this, it is necessary to remove the coating film and apply the lustering agent again. This step is repeated many times in a short period of time. When a conventional floor paint is applied, the coating film may suffer from big cracks and the floor material from non-negligible warpage. In addition, some show poor resistance to alkali.

Therefore, there is a demand on the development of a floor coating composition which overcomes or improves the conventional problems, which provides a coating film having superior gloss retentivity against an extremely large load created by walking, and superior staining resistance even against powerful contaminant substances, and which is capable of forming a coating film that permits easy removal of damages and color stain by polishing and the like.

The present inventors have already proposed a floor resin composition (Japanese Application No. 11-280124) as a composition which is associated with less degradation of the surface gloss caused by the load from walking, less damages or color stain caused by soil and sand, lard, process oil and the like, and is capable of easy removal of color stain by polishing and the like. However, this resin composition cannot suppress the warpage of coating objects (floor, floor material, plastic film, etc.) or cracks of the coating film.

BRIEF SUMMARY OF THE INVENTION

It is therefore an object of the present invention to provide a floor coating composition, which permits the use of water as a solvent, and which is capable of forming a coating film having staining resistance against extremely powerful contaminant substances and gloss retentivity against extremely great load from walking, which film permitting easy polishing away of damages and color stain. It is also an object of the present invention to provide a composition-coated floor material, which is obtained by covering a coating object with a coating film comprising the composition, wherein warpage of the coating object (floor, floor material, plastic film etc.) and cracks of the coating film are inhibited.

The present inventors have found that a floor coating composition comprising one or more unsaturated urethane compound(s), which is(are) obtained from an isocyanate compound(s) and a hydroxyl compound(s) as starting materials, wherein at least one of the isocyanate compound(s) and the hydroxyl compound(s) has an unsaturated bond(s), which composition characteristically permits water to be used as a solvent and satisfies the following conditions (1) and (2):

(1) at least one of the unsaturated urethane compounds contains a poly(alkyleneoxy) group(s) in a proportion of not less than 2 wt % and not more than 16 wt % of the total amount of the isocyanate compound(s) and the hydroxyl compound(s) used for the unsaturated urethane compound(s), and (2) the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of isocyanato group of the isocyanate compound(s) is not less than 6, or the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of hydroxyl group of the hydroxyl compound(s) is not less than 6. In addition, they have found that a composition-coated floor material, which is obtained by applying the composition onto the surface of a coating object, such as floor, floor material, plastic film and the like, and curing the surface is almost free of degradation of the surface glossiness even when subjected to an extremely great load from walking and is almost free of damage or stain from extremely strong contaminant substances, and that the damage and color stain can be removed easily by polishing and the like, which resulted in the completion of the present invention. It has been further found that, in the composition-coated floor material of the present invention, warpage of the coating object (floor, floor material, plastic film and the like) and cracks of the coating film can be suppressed.

With regard to the coating composition of the present invention, the following applies.

(I) When (2) above is "the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of isocyanato group of the isocyanate compound(s) is not less than 6",
- (I-i) the isocyanate compound preferably has not less than 3 isocyanato groups, and the isocyanate compound is particularly preferably tris(isocyanatoalkyl)-substituted isocyanurate compound, and
- (I-ii) the hydroxyl compound preferably has an unsaturated bond(s), and
- (II) when (2) above is "the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of hydroxyl group of the hydroxyl compound(s) is not less than 6",
  - (II-i) the hydroxyl compound preferably has not less than 3 hydroxyl groups, and
  - (II-ii) the isocyanate compound preferably has an unsaturated bond(s).

The coating composition of the present invention preferably comprises an unsaturated urethane compound(s) having at least one group selected from the group consisting of acryloyl, methacryloyl and allyl. As the poly(alkyleneoxy) group, one or more groups selected from the group consisting of poly(ethyleneoxy), poly(propyleneoxy) and poly(tetramethyleneoxy) is(are) preferable.

The floor coating composition of the present invention may further contain a curing agent. It may contain a poly(alkyleneoxy) group-containing epoxy resin. When a poly(alkyleneoxy) group-containing epoxy resin is to be contained in the floor coating composition, the preferable content thereof is not more than 30 wt % of the total solid content.

The floor coating composition of the present invention can be made to have an aqueous emulsion system or an aqueous dispersion system.

With regard to the composition-coated material, which comprises a coating object and a film obtained by curing the floor coating composition of the present invention, the coating object may be a floor material or a plastic film. The curing can be performed by one or more methods selected from heating, photoirradiation and electron beam irradiation.

DETAILED DESCRIPTION OF THE INVENTION

The coating film in the present invention does not refer to a film obtained by mere application of the coating composition of the present invention, but to a film obtained after drying and curing following the application.

The coating composition of the present invention contains an unsaturated urethane compound as a main component. As used herein, by the unsaturated urethane compound is meant a compound containing at least an unsaturated bond and a urethane bond.

The unsaturated bond is a typical unsaturated bond (carbon—carbon multiple bond which can become a saturated bond upon addition of hydrogen, halogen, hydrogen halide and the like), and which can be cured by radical polymerization, cation polymerization, anion polymerization and the like, upon heating, photoirradiation (preferably ultraviolet ray irradiation), electron beam irradiation and the like as it is or in the presence of a curing agent. Examples of the unsaturated bond in the present invention include unsaturated bonds derived from acryloyl group, methacryloyl group, allyl group, vinyl group, vinylidene group and the like. Preferred are an unsaturated bond derived from acryloyl group, methacryloyl group or allyl group. Of these, an unsaturated bond derived from acryloyl group is particularly preferable when a composition-coated material is obtained by photocuring, because polymerization proceeds quickly. One or more unsaturated bonds may be contained in an unsaturated urethane compound. A urethane bond is not naturally contained in the unsaturated bond. As used herein, acryloyl group and methacryloyl group are generally referred to collectively as a (meth)acryloyl group.

The floor coating composition of the present invention comprises one or more unsaturated urethane compounds, which is(are) obtained from an isocyanate compound(s) and a hydroxyl compound(s) as starting materials, wherein at least one of the isocyanate compound(s) and the hydroxyl compound(s) has an unsaturated bond(s), which composition characteristically satisfies the following conditions (1) and (2):

(1) at least one of the unsaturated urethane compounds has a poly(alkyleneoxy) group(s) in a proportion of not less than 2 wt % and not more than 16 wt % of the total amount of the isocyanate compound(s) and the hydroxyl compound(s) used for the unsaturated urethane compound(s), and (2) the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of isocyanato group of the isocyanate compound(s) is not less than 6, or the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of hydroxyl group of the hydroxyl compound(s) is not less than 6 (hereinafter the value of (2) is also referred to as a proportion of the number of unsaturated bonds).

In the unsaturated urethane compound of the present invention, at least one of isocyanate compound(s) and hydroxyl compound(s) has an unsaturated bond(s). It is preferable that the hydroxyl compound should have an unsaturated bond(s).

By the "isocyanate compound(s) and the hydroxyl compound(s) used for the unsaturated urethane compound(s)" in the above-mentioned (1) is meant any isocyanate compounds and hydroxyl compounds used for producing the coating composition of the present invention, whether or not it has a poly(alkyleneoxy) group. In the following, the method for calculating the "content of poly(alkyleneoxy) group(s) relative to the total amount of the isocyanate compound(s) and the hydroxyl compound(s) used for the unsaturated urethane compound(s) (hereinafter to be also referred to as a poly(alkyleneoxy) group content)" is explained in detail. In the present invention, the value calculated as in the above is rounded off to the first decimal place.

For example, when starting material a (charged amount:A g), starting material b (charged amount:B g), starting material c (charged amount:C g) and starting material d (charged amount:D g) are used as the starting materials, wherein the starting materials a and b have a poly(alkyleneoxy) group(s) in a molecule by a' wt % and b' wt %, respectively, and the starting materials c and d do not have a poly(alkyleneoxy) group, the value calculated by the equation $$\frac{a'A + b'B}{A + B + C + D}$$

becomes the poly(alkyleneoxy) group content. In the present invention, the poly(alkyleneoxy) group content in view of the water dispersibility and water emulsifiability of the coating composition and warpage of a coating object (floor, floor material, plastic film and the like) and cracks of the coating film of a composition-coated material is not less than 2 wt %, and that in view of the stain resistance and gloss retentivity of the coating film is not more than 16 wt %, preferably not more than 10 wt %. When the poly(alkyleneoxy) group content is less than 2 wt %, the coating composition is insufficient in water dispersibility and water emulsifiability, and warpage of a coating object (floor, floor material, plastic film and the like) and cracks of the coating film of the composition-coated material grow, and when it exceeds 16 wt %, the stain resistance and gloss retentivity of the coating film are degraded.

The poly(alkyleneoxy) group in the present invention can be expressed by

wherein R is linear or branched chain alkylene and n is an integer of 2–130, wherein alkylene at R is linear or branched chain alkylene having preferably 1–30, more preferably 2–20, particularly preferably 2–4, carbon atoms, such as methylene, ethylene, propylene, trimethylene, tetramethylene, hexamethylene and the like, preferably ethylene, propylene, trimethylene, tetramethylene. In the present invention, the unsaturated urethane compound may contain one or more of these. It is particularly preferable that the unsaturated urethane compound contain one or two poly(alkyleneoxy) groups selected from poly(ethyleneoxy), poly(propyleneoxy) and poly(tetramethyleneoxy).

The poly(alkyleneoxy) group can be introduced into an unsaturated urethane compound by any method which is subject to no particular limitation. For example, the unsaturated urethane compound may be produced using a compound having a poly(alkyleneoxy) group as a starting material thereof, the unsaturated urethane compound may be produced after reacting a starting material of the unsaturated urethane compound with a compound having a poly(alkyleneoxy) group, the unsaturated urethane compound may be produced by reacting a reaction mixture of a hydroxyl compound having an unsaturated bond and an isocyanate compound, with a compound having a poly(alkyleneoxy) group, or other methods.

The "value (T) obtained by multiplying the number of moles of each starting material having the unsaturated bond(s) by the number of the unsaturated bond(s) thereof, adding up the obtained values of the starting materials, and dividing the resulting value by the total of the number of moles of the starting materials having the unsaturated bond(s)" in the above-mentioned (2) refers to only the compounds having an unsaturated bond, from among the isocyanate compounds and hydroxyl compounds used as the starting materials for the production of the unsaturated urethane compound in the present invention. To be specific, when, for example, a coating composition is produced from the starting materials consisting of the isocyanate compounds having an unsaturated bond(s), wherein the numbers of the charged moles are $A_1$ (mol) and $A_2$ (mol), and the numbers of the unsaturated bond(s) are $a_1$ and $a_2$, respectively, and the hydroxyl compounds having an unsaturated bond(s), wherein the numbers of charged moles are $B_1$ (mol) and $B_2$ (mol), and the numbers of the unsaturated bond(s) are $b_1$ and $b_2$, respectively, it is expressed by the formula $$T = \frac{a_1A_1 + a_2A_2 + b_1B_1 + b_2B_2}{A_1 + A_2 + B_1 + B_2}$$

The "number (I) of isocyanato group of the isocyanate compound(s)" of the above-mentioned (2) is the number of the isocyanato group of the isocyanate compound(s) used, irrespective of having or not having an unsaturated bond. When two or more isocyanate compounds are used, the value obtained by multiplying the number of moles of each isocyanate compound used by the number of the isocyanate groups thereof, adding up the obtained values of the isocyanate compounds, and dividing the resulting value by the total of the number of moles of the isocyanate compounds is the "number of isocyanato group of the isocyanate compound". To be specific, when, for example, the numbers of moles charged of the isocyanate compound(s) used are X (mol) and Y (mol), and the numbers of the isocyanato bond are x and y, respectively, the value expressed by the formula $$I = \frac{xX + yY}{X + Y}$$

is the "number of isocyanato group of the isocyanate compound(s)" in this case.

The "number (H) of hydroxyl group of the hydroxyl compound(s)" in the above-mentioned (2) is the number of the hydroxyl group of the hydroxyl compound(s) used, irrespective of having or not having an unsaturated bond. When two or more hydroxyl compounds are used, the value obtained by multiplying the number of moles of each hydroxyl compound used by the number of the hydroxyl group thereof, adding up the obtained values of the hydroxyl compounds, and dividing the resulting value by the total of the number of moles of the hydroxyl compounds is the "number of the hydroxyl group of the hydroxyl compound(s)". To be specific, when, for example, the numbers of moles charged of the hydroxyl compound used are V (mol) and W (mol), and the numbers of the hydroxyl group are v and w, respectively, the value expressed by the formula $$H = \frac{vV + wW}{V + W}$$

is the "number of hydroxyl group of the hydroxyl compound(s)" in this case.

The above-mentioned (2) can be expressed as in the following using T, H and I obtained in the above. The value obtained by multiplying the number of moles of each starting material having the unsaturated bond(s) by the number of the unsaturated bond thereof, adding up the obtained values of the starting materials, dividing the resulting value by the total of the number of moles of the starting materials having the unsaturated bond(s) and multiplying the obtained value by the number of isocyanato group of the isocyanate compound(s) is the product of T and I obtained above, and the value obtained by multiplying the number of moles of each starting material having the unsaturated bond(s) by the number of the unsaturated bond thereof, adding up the obtained values of the starting materials, dividing the resulting value by the total of the number of moles of the starting materials having the unsaturated bond(s) and multiplying the obtained value by the number of hydroxyl group of the hydroxyl compound(s) is the product of T and H obtained above. In the present invention, either the product of T and I or the product of T and H should be not less than 6.

In the above-mentioned (2), the value (product of T and I) obtained by multiplying the number of moles of each starting material having the unsaturated bond(s) by the number of the unsaturated bond thereof, adding up the obtained values of the starting materials, dividing the resulting value by the total of the number of moles of the starting materials having the unsaturated bond(s) and multiplying the obtained value by the number of isocyanato group of the isocyanate compound(s) is preferably not less than 6. In this case, the number of the isocyanato group of the isocyanate compound is preferably not less than 3, and the isocyanate compound is particularly preferably tris(isocyanatoalkyl)-substituted isocyanurate compound. In this case, the hydroxyl compound preferably has an unsaturated bond(s).

In the above-mentioned (2), when the value (product of T and H) obtained by multiplying the number of moles of each starting material having the unsaturated bond(s) by the number of the unsaturated bond thereof, adding up the obtained values of the starting materials, dividing the resulting value by the total of the number of moles of the starting materials having the unsaturated bond(s) and multiplying the obtained value by the number of hydroxyl group of the hydroxyl compound(s) is not less than 6, the number of the hydroxyl group of the hydroxyl compound is preferably not less than 3, and the isocyanate compound preferably has an unsaturated bond(s).

In the present invention, the value (product of T and I or product of T and H) in the above-mentioned (2) should be not less than 6 to improve gloss retentivity and staining resistance of the coating film. When this value is less than 6, the coating film becomes insufficient in gloss retentivity and staining resistance, and easy removal of color stain, damage and the like on the coating film becomes unattainable. The upper limit of the value in the above-mentioned (2) is preferably not more than 9, more preferably not more than 7, in view of the warpage of a coating object (floor, floor material, plastic film and the like) and adhesion between the floor material and a coating film.

The unsaturated urethane compound in the present invention can be obtained by reacting an isocyanate compound and a hydroxyl compound according to a conventional method. The unsaturated bond may exist in either or both of the hydroxyl compound and isocyanate compound, preferably in the hydroxyl compound.

The production method of the unsaturated urethane compound in the present invention is explained in the following by referring to an unsaturated urethane compound having an unsaturated bond derived from (meth)acryloyl group as an example.

An unsaturated urethane compound having a (meth)acryloyl group can be obtained by, for example, urethane reaction of an isocyanate compound and a hydroxyl compound having a (meth)acryloyl group in a molecule. The production method of an unsaturated urethane compound having an unsaturated bond derived from a (meth)acryloyl group is explained in the following by referring to the reaction thereof. The production method of the unsaturated urethane compound having an unsaturated bond derived from a (meth)acryloyl group is not limited to such reaction.

As the above-mentioned isocyanate compound, there are mentioned a monoisocyanate compound, a diisocyanate compound, a polyisocyanate compound and the like, which is preferably a polyisocyanate compound.

The monoisocyanate compound in the present invention is exemplified by an aliphatic monoisocyanate compound, an alicyclic monoisocyanate compound, an aromatic monoisocyanate compound and the like, which is preferably an aliphatic monoisocyanate compound.

The aliphatic moiety of the aliphatic monoisocyanate compound in the present invention is a linear or branched chain saturated hydrocarbon group having preferably 1–36, more preferably 6–16, carbon atoms. Examples of the aliphatic monoisocyanate compound include methyl isocyanate, ethyl isocyanate, n-hexyl isocyanate, 2-ethylhexyl isocyanate, n-heptyl isocyanate, octyl isocyanate, nonyl isocyanate, decyl isocyanate, undecyl isocyanate, dodecyl isocyanate, tridecyl isocyanate, tetradecyl isocyanate, pentadecyl isocyanate, hexadecyl isocyanate, icosyl isocyanate, triacontyl isocyanate and the like, with preference given to n-hexyl isocyanate.

The alicyclic moiety of the alicyclic monoisocyanate compound in the present invention is saturated alicyclic hydrocarbon group having preferably 3–20, more preferably 6–10, carbon atoms. The alicyclic moiety is optionally substituted by one or more substituents as long as the substitution does not impair the object of the present invention. Examples of the substituent include isophoronyl, cyclohexyl and the like. Examples of the alicyclic monoisocyanate compound include cyclopropyl isocyanate, cyclobutyl isocyanate, cyclopentyl isocyanate, cyclohexyl isocyanate, cycloheptyl isocyanate, cyclooctyl isocyanate and the like, with preference given to cyclohexyl isocyanate.

The aromatic moiety of the aromatic monoisocyanate compound in the present invention is preferably benzene, naphthalene and the like, more preferably benzene. Two or more aromatic moieties may be included, wherein they are bonded via linear or branched chain alkylene preferably having 1–10 carbon atoms (particularly preferably methylene). The aromatic moiety is optionally substituted by one or more substituents as long as the substitution does not impair the object of the present invention. Examples of the substituent include linear or branched chain alkyl having preferably 6–20, more preferably 6–12, carbon atoms, alkylene having preferably 1–26, more preferably 1–12, carbon atoms, and the like. Examples of the aromatic monoisocyanate compound include phenyl isocyanate, naphthalene isocyanate, hexylphenyl isocyanate, heptylphenyl isocyanate, octylphenyl isocyanate, nonylphenyl isocyanate, decylphenyl isocyanate, undecylphenyl isocyanate, dodecylphenyl isocyanate, benzyl isocyanate, phenetyl isocyanate, 4,4'-diphenylmethylene isocyanate and the like, with preference given to benzyl isocyanate.

The diisocyanate compound in the present invention may be, for example, an aliphatic diisocyanate compound, an alicyclic diisocyanate compound, an aromatic diisocyanate compound and the like, with preference given to aliphatic diisocyanate.

The aliphatic moiety of the aliphatic diisocyanate compound in the present invention is linear or branched chain saturated hydrocarbon group having preferably 1–20, more preferably 6–10, carbon atoms. The aliphatic moiety is optionally substituted by one or more substituents as long as the substitution does not impair the object of the present invention. Examples of the substituent include mono or polyvalent group derived from isophorone, methylenebis (cyclohexane) and the like, carboxyl group and the like. Examples of the aliphatic diisocyanate compound include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-bis(isocyanatomethyl)hexanoic acid and the like, with preference given to hexamethylene diisocyanate.

The alicyclic moiety of the alicyclic diisocyanate compound in the present invention is saturated or unsaturated alicyclic hydrocarbon group having preferably 3–20, more preferably 6–10, carbon atoms. Two or more unsaturated alicyclic hydrocarbon groups may be present, in which case they are bonded via linear or branched chain alkylene having preferably 1–12, more preferably 6–10, carbon atoms. The alicyclic moiety is optionally substituted by one or more substituents as long as the substitution does not impair the object of the present invention. Examples of the substituent include linear or branched chain alkyl, having preferably 4–12, more preferably 6–10, carbon atoms and the like. Examples of the alicyclic diisocyanate compound include 1,3-cyclopentene diisocyanate, 1,4-cyclohexane diisocyanate, 1,3-cyclohexane diisocyanate, 1,3-bis(isocyanatomethyl)-3,3,5-trimethylcyclohexane, 4,4'-methylenebis(cyclohexyl isocyanate), 2,4-cyclohexane diisocyanate, 1,3-bis(isocyanatomethyl)cyclohexane, 1,4-bis(isocyanatomethyl)cyclohexane, 1,3-cyclopentene diisocyanate and the like, with preference given to 1,4-cyclohexane diisocyanate.

The aromatic moiety of aromatic diisocyanate compound in the present invention is preferably benzene or naphthalene, more preferably naphthalene. Two or more aromatic rings may be included, wherein each may be bonded via a single bond, linear or branched chain alkylene having preferably 1–20, more preferably 6–12, carbon atoms or an oxygen atom and the like. The aromatic moiety is optionally substituted by one or more substituents as long as the object of the present invention is not impaired. Examples of the substituent include linear or branched chain alkyl having preferably 2–20, more preferably 6–12, carbon atoms, amino and the like. Examples of aromatic diisocyanate compound include m-phenylene diisocyanate, p-phenylene diisocyanate, 4,4'-biphenyl diisocyanate, 1,5-naphthalene diisocyanate, 4,4'-diphenylmethane diisocyanate, 2,4- or 2,6-tolylene diisocyanate, 2,6-tolylene diisocyanate, 4,4'-diphenyl ether diisocyanate, isophorone diisocyanate, 1,6-hexane diisocyanate; 1,3- or 1,4-xylylene diisocyanate, a mixture of 1,3-xylylene diisocyanate and 1,4-xylylene diisocyanate, ω, ω'-diisocyanato-1,4-diethylbenzene, 1,3- or 1,4-bis(1-isocyanato-1-methylethyl)benzene and a mixture of 1,3-bis(1-isocyanato-1-methylethyl)benzene and 1,4-bis(1-isocyanato-1-methylethyl)benzene and the like, with preference given to 4,4'-diphenylmethane diisocyanate and 1,6-hexane diisocyanate.

The polyisocyanate compound in the present invention may be, for example, aliphatic polyisocyanate compound, alicyclic polyisocyanate compound, aromatic polyisocyanate compound and the like, with preference given to aliphatic polyisocyanate. Of the polyisocyanate compounds, one having not less than 3 isocyanato groups is particularly preferable.

The aliphatic moiety of aliphatic polyisocyanate compound in the present invention is linear or branched chain saturated hydrocarbon group having preferably 1–20, more preferably 6–10, carbon atoms, which is optionally substituted by one or more substituents as long as the object of the present invention is not impaired. Examples of the substituent include monovalent or polyvalent groups derived from isophorone, cyclohexane and the like. Examples of aliphatic polyisocyanate compound include 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane and the like.

The alicyclic moiety of alicyclic polyisocyanate compound in the present invention is saturated alicyclic hydrocarbon group having preferably 3–20, more preferably 3–10, carbon atoms, wherein two or more saturated alicyclic hydrocarbons may form a fused ring. Further, two or more alicyclic hydrocarbon groups may be included, wherein each may be bonded via a methylene group. The alicyclic moiety is optionally substituted by one or more substituents as long as the object of the present invention is not impaired. Examples of the substituent include linear or branched chain alkyl having preferably 4–12, more preferably 6–10, carbon atoms, linear or branched chain alkylene having preferably 4–12 carbon atoms, and the like. Examples of alicyclic polyisocyanate compound include 1,3,5-triisocyanatocyclohexane, 1,3,5-tris(isocyanatomethyl)cyclohexane, 2-(3-isocyanatopropyl)-2,5-di(isocyanatomethyl)bicyclo-[2.2.1]heptane, 2-(3-isocyanatopropyl)-2,6-di(isocyanatomethyl)bicyclo-[2.2.1]heptane, 3-(3-isocyanatopropyl)-2,5-di(isocyanatomethyl)bicyclo-[2.2.1]heptane, 5-(2-isocyanatoethyl)-2-(isocyanatomethyl)-3-(3-isocyanatopropyl)-bicyclo[2.2.1]heptane, 6-(2-isocyanatoethyl)-2-(isocyanatomethyl)-3-(3-isocyanatopropyl)-bicyclo[2.2.1]heptane, 5-(2-isocyanatoethyl)-2-(isocyanatomethyl)-2-(3-isocyanatopropyl)-bicyclo[2.2.1]heptane, 6-(2-isocyanatoethyl)-2-(isocyanatomethyl)-2-(3-isocyanatopropyl)-bicyclo[2.2.1]heptane and the like, with preference given to 1,3,5-tris(isocyanatomethyl)cyclohexane.

The aromatic moiety of aromatic polyisocyanate compound in the present invention is preferably benzene, naphthalene and the like, more preferably naphthalene, wherein two or more of these aromatic rings may be included. In this case, each ring is bonded via a single bond, linear or branched chain alkylene having preferably 2–20, more preferably 6–12, carbon atoms, and the like. The aromatic moiety is optionally substituted by one or more substituents as long as the object of the present invention is not impaired. Examples of the substituent include linear or branched chain alkyl having preferably 2–20, more preferably 6–12, carbon atoms, linear or branched chain alkylene having preferably 2–20 carbon atoms, and the like. Examples of aromatic polyisocyanate compound include triphenylmethane-4,4',4"triisocyanate, 1,3,5-triisocyanatobenzene, 2,4,6-triisocyanatotoluene, 4,4'-diphenylmethane-2,2',5,5'-tetraisocyanate and the like; 1,3,5-triisocyanatomethylbenzene and the like, with preference given to 1,3-bis(α,α-dimethylisocyanatomethyl)benzene.

The unsaturated urethane compound of the present invention can contain one or more of the above-mentioned isocyanate compounds in combination. Further, biuret compounds, isocyanurate compounds, adducts obtained by urethane reaction of various polyhydroxy compounds, allophanate compounds, oxadiazinetrione compounds and uretidione compound, which are the denatured compounds from one or more of the above-mentioned isocyanate compound, can be used as the isocyanate compound in the present invention. Of these, isocyanurate compounds are particularly preferable, such as tris(isocyanatoalkyl)-substituted isocyanurate compound. The alkyl moiety of tris(isocyanatoalkyl)-substituted isocyanurate compound is linear or branched chain alkyl having 2–20, preferably 2–10, carbon atoms, such as ethyl, butyl, hexyl and the like. Particularly preferable tris(isocyanatoalkyl)-substituted isocyanurate compound is tris(6-isocyanatohexyl)-isocyanurate.

Examples of hydroxyl compound having a (meth)acryloyl group in a molecule in the present invention include hydroxyalkyl (meth)acrylate, hydroxycycloalkyl (meth)acrylate, polyalkylene glycol mono(meth)acrylate, adduct of glycidyl (meth)acrylate and (meth)acrylic acid, ring-opening reaction product of these (meth)acrylate compounds and ε-caprolactone, adduct of glycidyl ether and (meth)acrylic acid, adduct of phenyl glycidyl ether and (meth)acrylic acid and the like, with preference given to hydroxyalkyl (meth)acrylate and polyalkylene glycol mono(meth)acrylate. The hydroxyl compounds having (meth)acryloyl in a molecule can be used alone or in combination of two or more of these.

The alkyl moiety of hydroxyalkyl (meth)acrylate in the present invention is linear or branched chain alkyl having preferably 2–100, more preferably 2–60, carbon atoms, which is optionally substituted as long as the object of the present invention is not impaired. Examples of the substituent include phenoxy, groups derived from caprolactam denatured diol, and the like. The hydroxyalkyl (meth)acrylate may contain one or more (meth)acryloyl groups in a molecule. Examples of hydroxyalkyl (meth)acrylate include mono(meth)acrylate such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, 2-hydroxy-3-phenoxypropyl (meth)acrylate and the like; di(meth)acrylate such as trimethylolpropane di(meth)acrylate, trimethylolethane di(meth)acrylate, glycidol dimethacrylate and the like; pentaerythritol tri(meth)acrylate, dipentaerythritol hexa(meth)acrylate and the like, with preference given to pentaerythritol tri(meth)acrylate.

The cycloalkyl moiety of hydroxycycloalkyl (meth)acrylate in the present invention is cycloalkyl having preferably 3–30, more preferably 4–20, carbon atoms, which is optionally substituted as long as the object of the present invention is not impaired. Examples of the substituent include methyl, ethyl, and a group derived from ethoxylated bisphenol. The hydroxycycloalkyl (meth)acrylate may contain one or more (meth)acryloyl groups in a molecule. Examples of hydroxycycloalkyl (meth)acrylate include cyclohexanedimethanol mono(meth)acrylate, cycloheptanedimethanol mono(meth)acrylate, cyclooctanedimethanol mono(meth)acrylate, caprolactam denatured mono(meth)acrylate, spiroglycol denatured mono(meth)acrylate and the like, with preference given to cyclohexanedimethanol mono(meth)acrylate.

The alkyl moiety of polyalkylene glycol mono(meth)acrylate in the present invention is linear or branched chain alkyl having 1–100, preferably 2–60, carbon atoms, wherein each alkyl moiety may be bonded via an oxygen atom. The polyalkylene glycol mono(meth)acrylate may contain one or more (meth)acryloyl groups in a molecule. Examples of polyalkylene glycol mono(meth)acrylate include mono(meth)acrylate such as polyethylene glycol mono(meth)acrylate, polypropylene glycol mono(meth)acrylate, poly(tetramethyleneoxido mono(meth)acrylate) and the like, and adduct of (meth)acrylic acid and ethylene-propylene glycol block polymer, with preference given to polyethylene glycol mono(meth)acrylate.

It is also possible to use various polyhydroxyl-containing compounds in urethane reaction of isocyanate compound and a hydroxyl compound having a (meth)acryloyl group in a molecule. The use of a polyhydroxyl-containing compound is preferable because it improves water dispersibility and water emulsifiability of the coating composition, and suppresses the warpage of the coating object (floor, floor material, plastic film and the like). The polyhydroxyl-containing compound can be used for the production method of the unsaturated urethane compound as in the following. First, a polyhydroxyl-containing compound is preliminarily reacted with an excess isocyanate compound to synthesize a prepolymer having an isocyanate terminal. Then, this prepolymer is reacted with a hydroxyl compound having a (meth)acryloyl group in a molecule to produce an unsaturated urethane compound. These reactions may be carried out concurrently.

Examples of the polyhydroxyl-containing compound include alkylene glycol, polyhydroxyl-containing carbonic acid and derivatives thereof (e.g., hydroxypivalic acid neopentyl glycol ester, dimethylolpropionic acid, dimethylolbutanoic acid and the like), polyhydroxyl-containing alicyclic compound (e.g., cyclohexanedimethylol, 1,4-cyclohexanediol, spiroglycol (e.g., 3,9-bis(1,1-dimethyl-2-hydroxyethyl)-2,4,8,10-tetraoxaspiro[5.5]undecane and the like), tricyclo[5.2.1.0]decane-4,8-dimethanol, 2,2,6,6-tetramethylolcyclohexanol-1, inositol and the like), bisphenol compound and adduct of alkylene oxide and bisphenol compound (e.g., hydrogenated bisphenol A, adduct of ethylene oxide and bisphenol A, adduct of propylene oxide and bisphenol A, adduct of hydroxyethylene oxide and bisphenol A, adduct of ethoxy and bisphenol S and the like), polyhydroxyl-containing aliphatic compound (e.g., trimethylolethane, trimethylolpropane, ditrimethylolethane, ditrimethylolpropane, glycerin, diglycerol, 3-methylpentane-1,3,5-triol, pentaerythritol, dipentaerythritol, tripentaerythritol, mannitol, sorbitol and the like), isocyanurate compound (e.g., tris(2-hydroxyethyl)isocyanurate and the like), glucose (e.g., hydroxypropylmethylcellulose phthalate, hydroxypropylmethylcellulose acetate and the like); polyester polyol, polyether polyol, polycarbonate polyol (preferably polyester polyol) and the like, particularly preferably dipentaerythritol. These can be used alone or in combination of two or more compounds thereof.

The alkylene of alkylene glycol of the above-mentioned polyhydroxyl-containing compound is linear or branched chain alkylene having 2–100, preferably 2–60, carbon atoms, which is optionally substituted by one or more substituents, such as halogen atom, —SH, —SR (wherein R is alkyl which is preferably alkyl having 2–12 carbon atoms) and the like. Examples of alkylene glycol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, dichloroneopentyl glycol, dibromoneopentyl glycol and the like, with preference given to ethylene glycol and dipropylene glycol.

The urethane reaction of the isocyanate compound and the hydroxyl compound in the present invention is carried out by using these compounds in a proportion of preferably 0.9–1.1 equivalents, more preferably 1.0–1.05 equivalents, of an isocyanato group relative to a hydroxyl group. The urethane reaction can be carried out without a solvent or in an inert solvent to the isocyanato group and hydroxyl group. Examples of such inert solvent include ethyl acetate, butyl acetate, acetone, ethyl methyl ketone, chloroform, chloromethane, toluene, tetrahydrofuran and the like. When the urethane reaction is carried out in a solvent, the amount of the solvent varies depending on the scale of the reaction and the like, and is determined according to the handling performance.

The above-mentioned urethane reaction can be generally carried out in a temperature range of 0–120° C. For an efficient progress of the reaction, it is preferably carried out at 30–90° C. When the reaction temperature is lower than 0° C., the urethane reaction may not proceed or a side product may be produced easily.

When the urethane reaction does not proceed sufficiently due to the properties of the starting materials, a catalyst may be used to accelerate the reaction. Examples of the suitable catalyst include organic tin compound (e.g., dibutyltin laurate, dibutyltin octate, dibutyltin dimethoxide and the like), amine compound (e.g., triethylamine, diethanolamine, dimethylbutylethanolamine and the like) and the like. Besides these, titanium compound, aluminum compound, zirconium compound and the like can be also used. The amount of the catalyst used is preferably 0.01–2.5 wt %, more preferably 0.1–1.5 wt %, of the starting materials, which can be adjusted appropriately depending on the kind of the starting materials and amounts thereof.

According to the present invention, a suitable amount of a polymerization inhibitor can be added to the reaction system to prevent polymerization of the resulting unsaturated urethane compound in the reaction system. Examples of the polymerization inhibitor include hydroquinone, methylhydroquinone, 2,6-di-tertbutyl-4-methylphenol and the like. The amount of the polymerization inhibitor used is preferably 0.0001–1.0 wt %, more preferably 0.001–0.1 wt %, of the starting materials, which can be adjusted appropriately depending on the kind of the starting materials and amounts thereof. When the amount of the polymerization inhibitor used is too large, the coating composition of the present invention shows poor curing property, but when it is too small, the coating composition of the present invention shows poor stability, thus resulting in gellation during storage or reaction.

The composition-coated material of the present invention comprises a film obtained by curing the coating composition of the present invention and a coating object, which is obtained by applying the coating composition of the present invention onto the coating object and curing the composition. The composition-coated material of the present invention thus obtained has staining resistance to extremely powerful contaminant substances and gloss retentivity against extremely large load from walking. In addition, damages and color stain can be easily polished away. As such, the coating composition of the present invention preferably contains one or more unsaturated urethane compounds, which is(are) obtained from an isocyanate compound(s) and a hydroxyl compound(s), wherein at least one of the isocyanate compound(s) and the hydroxyl compound(s) has an unsaturated bond(s), and a curing agent.

The coating object in the present invention include not only a floor but also anything that ultimately forms a part of the floor. Examples thereof include floor, floor material, plastic film and the like.

The curing agent to be used in the present invention preferably includes a heat curing agent, a photo(UV)curing agent, an electron beam curing agent and the like. The kind of the curing agent can be determined according to the curing means of the coating of the present invention. When curing involves photo(UV)irradiation, a photo(UV)curing agent can be used. When heating and photo(UV)irradiation are simultaneously applied for curing, a heat curing agent and a photo(UV)curing agent are preferably used concurrently. The amount of the curing agent in the present invention is generally preferably 0.01–10 parts by weight, more preferably 0.1–5 parts by weight, per 100 parts by weight of the unsaturated urethane compound. As a result, the curing reaction proceeds effectively for the coating composition of the present invention.

Examples of the heat curing agent in the present invention include organic peroxides such as diacyl peroxide (e.g., dioctanoyl peroxide, didecanoyl peroxide and the like), peroxy ester (e.g., tert-butylperoxy acetate, tert-butylperoxy isobutylate and the like), hydroperoxide (e.g., tert-butyl hydroperoxide, cumenyl hydroperoxide and the like), dialkyl peroxide (e.g., di-tert-butyl peroxide, 2,5-dimethyl-2,5-di(tert-butyloxy)hexylene-3 and the like), ketone peroxide (e.g., ethyl methyl ketone peroxide and the like), peroxy ketal (e.g., 1,1-bis(tert-butylperoxy)cyclohexane and the like), percarbonate (e.g., diisopropyl peroxycarbonate and the like), and the like.

Examples of the photo(UV)curing agent in the present invention include benzyl dimethyl ketal, 1-hydroxycyclohexyl phenyl ketone, 2-methyl-1-[4-(methylthio)phenyl]-2-morpholinopropan-1-one, 2-hydroxy-2-methyl-1-phenyl-propan-1-one, 2-benzyl-2-dimethylamino-1-(4-morpholinophenyl)-butan-1-one, 1-[4-(2-hydroxyethoxy)-phenyl]-2-hydroxy-2-methyl-1-propan-1-one, bisacylphosphine oxide, acylphosphine oxide, 2,4,6-trimethylbenzoyldiphenylphosphine oxide, 2,6-dimethylbenzoyldiphenylphosphine oxide, benzoyldiethoxyphosphine oxide, bis(2,6-dimethoxybenzoyl)-2,4,4-trimethylpentylphosphine oxide, benzoyl alkyl ether (e.g., benzoin methyl ether, benzoin ethyl ether, benzoin isopropyl ether, benzoin isobutyl ether, n-butyl benzoin ether and the like), 1-(4-isopropylphenyl)-2-hydroxy-2-methylpropan-1-one, 2-hydroxy-2-methyl-1-phenylpropan-1-one, p-tert-butyl-trichloroacetophenone, p-tert-butyldichloroacetophenone, benzyl, benzoyl, acetophenone, benzophenone, thioxanthone (e.g., 2-chlorothioxanthone, 2-methylthioxanthone, 2,4-diethylthioxanthone, 2,4-diisopropylthioxanthone etc.), dibenzosuberone, 4,4'-dichlorobenzophenone, 4,4'-bis(dimethylamino)benzophenone, 4,4'-bis(diethylamino)benzophenone, 3,3',4,4'-tetra(tert-butylperoxycarbonyl)benzophenone, benzalacetone, biacetyl, α,α-dichloro-4-phenoxyacetophenone, tetramethylthiuram disulfide, α,α'-azobisisobutyronitrile, benzoyl peroxide, 3,3'-dimethyl-4-methoxybenzophenone, methyl benzoylformate, 2,2-diethoxyacetophenone, acyloxime ester, chlorinated acetophenone, hydroxyacetophenone, acetophenone diethyl ketal, 4'-isopropyl-2-hydroxy-2-methylpropiophenone, methyl phenylglyoxylate, methyl o-benzoylbenzoate, methyl p-dimethylaminobenzoate, 2,2'-bis(o-chlorophenyl)-4,5,4', 5'-tetraphenyl-1,2'-biimidazole, 10-butyl-2-chloroacridone, camphorquinone, 3-ketocoumarin, anthraquinone (e.g., anthraquinone, 2-ethylanthraquinone, α-chloroanthraquinone, 2-tert-butylanthraquinone and the like), acetonaphthene, 4,4'-dimethoxybenzil, 4,4'-dichlorobenzil and the like.

The coating composition of the present invention contains a reactive diluent, an additive, a solvent and the like where necessary.

The reactive diluent is generally added in the present invention to lower the viscosity of the coating composition. It may be also added for improving the properties of a coating film such as adhesion to a coating object, flexibility and the like. Examples of the reactive diluent include a reactive diluent having one unsaturated bond, a reactive diluent having two unsaturated bonds, a reactive diluent having three or more unsaturated bonds and the like. These reactive diluents can be used alone or in combination of plural kinds thereof. The upper limit of the amount of the reactive diluent used is preferably not more than 400 parts by weight, more preferably not more than 100 parts by weight, per 100 parts by weight of the unsaturated urethane compound. The lower limit of the amount of the reactive diluent used is preferably not less than 20 parts by weight per 100 parts by weight of the unsaturated urethane compound in view of dilution viscosity. When the amount exceeds 400 parts by weight, a composition-coated material may show degraded properties of the coating film, such as staining resistance, resistance to abrasion, chemical resistance and light resistance.

When the unsaturated bond of the unsaturated urethane compound is derived from (meth)acrylate, examples of reactive diluent include the following.

Examples of the reactive diluent having one unsaturated bond include (meth)acrylic acid, alkyl (meth)acrylate, dialkylaminoalkyl (meth)acrylate, glycidyl (meth)acrylate, carbitol (meth)acrylate, isobornyl (meth)acrylate, acryloylmorpholine and the like.

The alkyl moiety of the above-mentioned alkyl (meth)acrylate is linear or branched chain alkyl having preferably 1–20, more preferably 2–10, carbon atoms, which is optionally substituted by one or more substituents such as hydroxy, phenoxy, glycidyl, carboxyl and the like. Examples of alkyl (meth)acrylate include methyl (meth)acrylate, ethyl (meth)acrylate, butyl (meth)acrylate, hexyl (meth)acrylate, 2-ethylhexyl (meth)acrylate, isooctyl (meth)acrylate, 2-hydroxyethyl (meth)acrylate, 2-hydroxypropyl (meth)acrylate, 2-hydroxy-3-phenoxypropyl (meth)acrylate and the like, with preference given to 2-hydroxyethyl (meth)acrylate.

The alkyl moiety of the above-mentioned dialkylaminoalkyl (meth)acrylate is linear or branched chain alkyl having preferably more preferably 2–8, carbon atoms. The alkyl moieties of the dialkyl moiety are independently the same or different and each is linear or branched chain alkyl having preferably 1–20, more preferably 2–8, carbon atoms. Examples of dialkylaminoalkyl (meth)acrylate include N,N'-dimethylaminoethyl (meth)acrylate, N,N'-diethylaminoethyl (meth)acrylate and the like, with preference given to N,N'-diethylaminoethyl (meth)acrylate.

Examples of reactive diluent having two unsaturated bonds include alkanediol di(meth)acrylate, polyalkylene glycol di(meth)acrylate and the like.

The alkane moiety of the above-mentioned alkanediol di(meth)acrylate is linear, branched chain or cyclic hydrocarbon having preferably 1–20, more preferably 2–8, carbon atoms, which is optionally substituted by one or more substituents such as hydroxy and phenoxy. Examples of alkanediol di(meth)acrylate include 1,6-hexanediol di(meth)acrylate, neopentylglycol di(meth)acrylate, ethylene glycol di(meth)acrylate, butylene glycol di(meth)acrylate, pentaerythritol di(meth)acrylate and 1,4-butanediol di(meth)acrylate.

The alkylene in the above-mentioned polyalkylene glycol di(meth)acrylate is linear or branched chain alkylene having preferably 1–20, more preferably 2–10, carbon atoms. Examples of polyalkylene glycol di(meth)acrylate include polyethylene glycol di(meth)acrylate, polypropylene glycol di(meth)acrylate, caprolactam denatured di(meth)acrylate and the like, with preference given to polyethylene glycol di(meth)acrylate.

Examples of the reactive diluent having 3 or more unsaturated bonds include trimethylolpropane tri(meth)acrylate, pentaerythritol tri(meth)acrylate, dipentaerythritol hexa(meth)acrylate, tetramethylolmethane tetra(meth)acrylate, acrylic acid esters of N,N,N',N'-tetrakis($\beta$-hydroxyethyl) ethyldiamine, and the like.

The reactive diluent when the unsaturated bond of the unsaturated urethane compound derives from an allyl group is, for example, diallyl phthalate, diallyl isophthalate, diallyl adipate and the like.

The reactive diluent when the unsaturated bond of the unsaturated urethane compound derives from a vinyl group is, for example, styrene, acrylonitrile, vinyl acetate, vinyl toluene, N-vinylpyrrolidone and the like.

The additive that can be used in the present invention includes sensitizer, coloring agent, anti-foaming agent, defoaming agent, wetting agent, leveling agent, antistatic agent, viscosity controlling agent, storing stabilizer, antibacterial agent, antislip agent, coating film crack inhibitor, adhesion promoter, dispersant, surfactant, extender pigment, mold release agent, silane coupling agent, stabilizer, fire retardant and the like, which are conventionally used.

Besides these, the coating composition of the present invention may contain an organic metal salt, such as cobalt naphthenate, cobalt octenoate and the like, paraffin wax and the like, to aid the improvement of surface dryness.

The coating composition of the present invention can contain other natural and synthetic polymers such as unsaturated polyester resin, vinylurethane resin, vinyl ester urethane resin, polyisocyanate, polyepoxide (i.e., epoxy resin), acryl resins, alkyd resins, urea resins, melamine resins, poly(vinyl acetate), vinyl acetate copolymer, polydiene elastomer, saturated polyesters and saturated polyethers, cellulose derivatives such as nitrocellulose, cellulose acetate butyrate and the like, rosin derivative, and fats and oils such as linseed oil, tung oil, soybean oil, castor oil, epoxidized oil and the like. The addition of these affords a decrease in the shrinkage rate upon curing of the coating film made from the coating composition of the present invention, thereby to often suppress warpage of the coated material and cracks of the coating film. Of these, an epoxy resin is particularly preferable because cracks of the coating film and warpage of the coated material can be more suppressed than with other polymers, though staining resistance and gloss retentivity decrease somewhat. The order of addition, method of addition and the like of these to the coating composition are not particularly limited. For example, they are mixed with an unsaturated urethane compound and then added to the coating composition.

The epoxy resin to be added to the coating composition of the present invention is not particularly limited as long as it does not impair the object of the present invention. For example, poly(alkyleneoxy) group-containing epoxy resin can be used. The poly(alkyleneoxy) group-containing epoxy resin is preferably contained in the coating composition in a proportion of not more than 30 wt % of the entire solid content. When it exceeds 30 wt %, the staining resistance and gloss retentivity of the coating film is more degraded than necessary for the use intended in the present invention.

The poly(alkyleneoxy) group-containing epoxy resin is free of any particular limitation as long as it is an epoxy resin having a poly(alkyleneoxy) group (e.g., bisphenol type, biphenyl type, novolak type, aliphatic and the like). In view of the cost and availability of materials, a bisphenol type epoxy resin having a poly(alkyleneoxy) group is preferable. In the present invention, by "epoxy" is meant a cyclic ether wherein oxygen atom is bonded to two carbon atoms in one molecule, which is exemplified by 1,2-epoxy, 1,3-epoxy and 1,4-epoxy. Examples of the bisphenol type epoxy resin include a compound of the formula

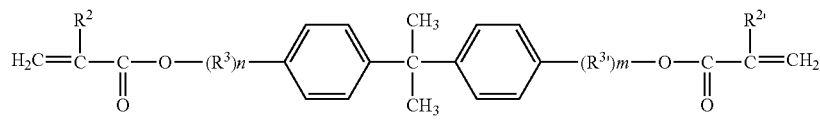

wherein $R^2$ and $R^{2'}$ are each independently a hydrogen atom or methyl group; $R^3$ and $R^{3'}$ are each independently $-CH_2CH_2O-$, $-CH_2(CH_3)CH_2O-$, $-CH_2CH_2(CH_3)O-$, $-CH_2CH_2CH_2O-$, $-CH_2CH_2OCH_2CH_2CH_2O-$, $-CH_2CH_2OCH_2(CH_3)CH_2O-$ or $-CH_2CH_2OCH_2CH_2(CH_3)O-$, provided that an oxygen atom at the bonding site of these alkyleneoxy groups is bonded to bisphenol; and n and m are at least 1 and n+m is 2–30.

The above-mentioned poly(alkyleneoxy) group-containing epoxy resin, such as the compound of the above-mentioned formula, can be obtained by the following method. That is, after the addition of polymer of alkylene oxide (polymer of ethylene oxide, propylene oxide or trimethylene oxide, or copolymer of ethylene oxide and propylene oxide) to bisphenol, the resulting compound is subjected to esterification reaction with (meth)acrylic acid.

Besides the above-mentioned natural and synthetic polymers, various fillers, pigments and dyes can be added, such as calcium carbonate, talc, mica, clay, silica powder, colloidal silica, polymer fine particles, asbestos powder, barium sulfate, aluminum hydroxide, zinc stearate, titanium white, zinc white, red iron oxide, azo pigment, glass fiber, carbonate fiber, silicon carbide fiber, aramid fiber and the like.

The composition-coated material of the present invention can be obtained by applying the above-mentioned coating composition onto a coating object (floor, floor material, plastic film and the like) and curing the composition. When a solvent remains in a coating film during the curing, it is necessary to dry the coating film to remove the solvent. The coating film can be dried by a method generally used for drying a paint, such as natural drying, hot air drying and the like.

The coating composition of the present invention is applied to a coating object (floor, floor material, plastic film and the like), such that the film thickness after drying is not less than 3 µm, preferably not less than 5 µm. When the film thickness after drying is less than 3 µm, the glossiness of the coating film soon after application may become lower. When it is not less than 5 µm, it preferably maintains high glossiness even after removing the stained part by polishing and the like. The coating composition of the present invention is applied to a coating object (floor, floor material, plastic film and the like), such that the film thickness after drying becomes not more than 200 µm, preferably not more than 50 µm. When the film thickness after drying exceeds 200 µm, the application work takes a long time and the time necessary for drying and curing of the coating film becomes longer. In addition, the quantity of heat and the irradiation light increases and the cracks of the coating film and warpage of a coating object (floor, floor material, plastic film and the like) due to shrinkage may easily become greater.

The coating composition of the present invention can be used as an aqueous emulsion (a system where a coating composition is dispersed and emulsified as droplets in water using an emulsifier) or an aqueous dispersion (a system where a coating composition is dispersed as particles in water) using water when applying to a coating object (floor, floor material, plastic film and the like). Water is preferably used as a solvent, because it does not generate an odor or a toxic gas upon evaporation, which is preferable from the environmental aspect, as well as for the health of the person who applies the composition. It is further preferable because an organic solvent is not necessary for washing. Inasmuch as the coating composition of an aqueous emulsion system or aqueous dispersion system generally has low viscosity, it is suitable for an easy method of application, such as with a brush, roller, sheepskin, mop, spray and the like.

The coating composition of the present invention can be prepared into an aqueous emulsion or aqueous dispersion by a method usually employed for preparing a composition into an aqueous emulsion or aqueous dispersion. The coating composition of the present invention is treated according to method 1: an emulsifier is mixed in advance with water and/or coating composition and the coating composition (or emulsifier-containing coating composition) is added to water (or emulsifier-containing water) with high speed stirring, or method 2: an emulsifier is mixed with water and/or coating composition in advance and water (or emulsifier-containing water) is added to the coating composition (or emulsifier-containing coating composition) with high speed stirring to make the coating composition into an aqueous emulsion or aqueous dispersion. In the above-mentioned methods 1 and 2, the coating composition and water are warmed beforehand as necessary to impart fluidness. In the above-mentioned methods 1 and 2, the coating composition may be dissolved in a solvent (e.g., ethyl acetate, benzene, isopropyl alcohol etc.) beforehand as necessary, and the solvent used can be removed after forming the coating composition into an aqueous emulsion or aqueous dispersion.

The emulsifier used when preparing the coating composition of the present invention into an aqueous emulsion is not particularly limited as long as it does not impair the object of the present invention. For example, a nonionic surfactant, an anionic surfactant, a cationic surfactant, an amphoteric surfactant and the like can be used.

Examples of the above-mentioned nonionic surfactant include saponin (e.g. saponin bonded with steroid and the like), alkylene oxide derivative (e.g., polyethylene glycol, polyethylene/polypropylene glycol condensate, polyethylene glycol alkyl or alkylaryl ether, polyethylene glycol esters, polyethylene glycol sorbitan esters, polyalkylene glycol alkylamine or amides, adduct of polyethylene oxide and silicone and the like), glycidol derivative (e.g., polyglyceride of alkenylsuccinic acid, alkylphenol polyglyceride and the like), fatty acid esters of polyhydric alcohols, alkyl esters of sugar, urethanes, ethers and the like.

The above-mentioned anionic surfactant is exemplified by triterpenoid saponin, alkylcarbonate, alkylsulfonate, alkylbenzene sulfonate, alkylnaphthalene sulfonate, alkylsulfuric acid esters, alkylphosphoric acid ester salt, N-acyl-N-alkyltaurine, sulfosuccinic acid esters, sulfosuccinate, sulfoalkylpolyoxyethylene alkylphenyl ethers, polyoxyethylene alkylphosphoric acid esters and the like, that contain an acidic group such as carboxy group, sulfo group, phospho group, sulfuric acid ester group, phosphoric acid ester group and the like.

The above-mentioned amphoteric surfactant is exemplified by amino acids, aminoalkylsulfonic acids, aminoalkylsurfric acids and phosphoric acid esters, alkylbetaines, amineimides, amine oxides and the like.

The above-mentioned cationic surfactant is exemplified by alkylamine salt, aliphatic or aromatic quaternary ammonium salts, heterocyclic quaternary ammonium salts such as pyridinium, imidazolium and the like, phosphonium or sulfonium salts containing an aliphatic group or heterocycle, and the like.

Of these emulsifiers, for example, sodium dodecylbenzenesulfonate, sodium nonylphenol ethylene oxide sulfonate, sodium sulfosuccinate and the like are preferable.

The coating composition of the present invention can be also used without solvent or in an organic solvent (e.g., methanol, ethanol, isopropyl alcohol, ethyl acetate, toluene and the like), besides as the aqueous emulsion or aqueous dispersion.

A composition-coated material can be produced using the coating composition of the present invention by directly applying the composition to the floor at the application site, or by applying the floor coating composition of the present invention to a floor material manufactured in a factory, followed by curing, and fitting the material into the floor at the site, or by applying the coating composition of the present invention to a plastic film, followed by curing, using the film to constitute a part of the floor material such as a resin tile or sheet and the like, and combining the same with a floor or floor material, thereby indirectly applying to a floor.

The floor in the present invention can be formed with any floor material, such as those exemplified in the following.

The "floor material" in the present invention can be of any shape or state as long as it is made from the materials usually employed for floors. For example, i) resin materials such as vinyl chloride and the like, ii) wooden materials such as flooring and the like, iii) ceramic materials such as porcelain tile and the like, iv) stone materials such as marble and the like, v) concrete materials such as mortar and the like, or other floor materials are applicable. In addition, the coating composition of the present invention can be applied to coated floor materials having a coating film, which film being other than the coating film made from the coating composition of the present invention, formed on the surface of the floor materials of these i)-v). The material of the coating film formed on the surface of the coated floor materials is not particularly limited as long as it is typically used for this purpose, such as epoxy resins, urethane resins, acrylic resins, MMA resins, polyester resins and the like.

i) Examples of the floor materials made from resin materials such as vinyl chloride and the like include vinyl floor tiles such as composition vinyl floor tile, homogeneous vinyl floor tile and the like, vinyl floor sheet foam such as cushion floor and the like, vinyl floor sheets such as woven fabric-vinyl floor sheet laminate, non-woven fabric-vinyl floor sheet laminate and the like, linoleum floor material, natural material tiles such as cork tile, rubber tile and the like and the like.

ii) Examples of the floor materials made of wooden materials such as flooring and the like include single layer flooring, composite flooring, flooring board, flooring block, mosaic パーケット, soundproof floor, noise insulation double floor, free access floor, and the like.

iii) Examples of the floor materials made of ceramic material such as porcelain tile and the like include porcelain tile, china tile, china block, non-slip tile and the like.

iv) Examples of the floor materials made of stone materials such as marble and the like include marble, granite, terrazzo such as resin terrazzo and cement terrazzo, and the like.

Examples of the above-mentioned plastic film include films made from cellulose resin and the like, such as polystyrene, acrylic polymer, polycarbonate, poly(vinyl chloride), polyethylene, nylon, polypropylene, modified polypropylene, poly(ethylene terephthalate), poly(ethylene naphthalate), ethylene vinylacetate, poly(vinyl alcohol), cellulose acetate, cellulose butylate, and the like.

The method for using a film obtained by applying the coating composition of the present invention to a plastic film, followed by curing, as a half-finished product constituting a part of the floor material, such as resin tile and sheet and the like, may be, for example, a method comprising applying the coating composition of the present invention to a plastic film and curing and pressing the plastic film against a backing sheet (e.g., vinyl chloride sheet and the like) with heat and the like. It is also possible to print on the above-mentioned plastic film and backing sheet before pressing. Alternatively, a printed paper, a printed plastic film and the like are inserted between the above-mentioned film and the backing sheet, followed by pressing, to give a half-finished product.

Forming a sealer resin film on the surface of a coating object (floor, floor material, plastic film and the like) before applying the coating composition of the present invention to the coating object is preferable, because it prevents infiltration of the coating composition into the coating object, and enables accurate control of the thickness after drying of the coating film. A sealer resin film is particularly preferably formed on a coating object susceptible to the infiltration of the composition. The thickness of the sealer resin film can be freely set depending on the various functions necessary for the surface of a coating object, and is not particularly limited as long as it prevents infiltration of the coating composition of the present invention into a coating object and the required property of the coating film can be achieved.

The sealer resin is not particularly limited as long as it is usually used as a paint for sealing. Examples of the resin include resins of urethane, acrylic, epoxy, vinyl acetate and the like, which may be in an organic solvent, an aqueous solution, an aqueous emulsion system, an aqueous dispersion system or any form. The sealer resin film can be dried by a typical drying method for paints, such as photocuring, natural drying, hot air drying and the like. In general, a method requiring a shorter drying time and causing less degradation due to light is preferable. The sealer resin film is preferably dried before applying the coating composition of the present invention.

The coating composition of the present invention can be preferably cured by one or more methods in combination, which is selected from the group consisting of heating, photoirradiation and electron beam irradiation. The heating, photoirradiation or electron beam irradiation can be applied solely. Alternatively, heating and photoirradiation may be performed simultaneously. The coating composition of the present invention is preferably cured by photoirradiation or electron beam irradiation.

For curing by heating, the heating temperature is determined depending on the constituent components, proportion thereof and amount and the like of the coating composition. The heating is performed at a temperature that allows the coating composition to cure. The heating temperature can be generally within the range free in deformation and the like of a coating object, which is preferably 50–100° C., more preferably 80–100° C. The method of heating is not particularly limited as long as it is typically used for heat drying paints.

The curing by photoirradiation is performed using a light source in the range of visible light, such as a halogen lamp, a xenon lamp and the like, high pressure mercury lamp, a light source of the range of ultraviolet light, such as a metal halide lamp and the like, sunrays and the like. For fine curing, a light source capable of emitting light containing many short wavelength components is preferably used. The quantity of the irradiation light on the irradiation surface is preferably 1–5000 mJ/cm$^2$, more preferably 10–3000 mJ/cm$^2$. When the quantity of the irradiation light on the irradiation surface is less than 1 mJ/cm$^2$, the curing rate of the coating film made from the coating composition may become lower, or unreacted components may be involved, which in turn may prevent expression of the gloss retentivity and staining resistance of the coating film. When the quantity of the irradiation light on the irradiation surface exceeds 5000 mJ/cm$^2$, a longer irradiation time is necessary with a facility having lower irradiation capability. When the irradiation of the quantity of the irradiation light in a short time is attempted, a facility having higher irradiation capability becomes necessary, which results in a higher facility cost, possibly associated with degradation of the coating film.

The curing with an electron beam is preferably performed using various electron beam accelerators, such as Cockcroft-Walton type, van de Graaff type, oscillator transformer type, insulated core transformer type, linear type, Dynamitron type and high frequency type accelerators. By the irradiation of an electron beam having an acceleration voltage of preferably 30–500 kV, particularly preferably 30–100 kV, a coating film made from the coating composition of the present invention can be cured. When a coating film is cured with an electron beam having an acceleration voltage of 30–100 kV, the flexibility and processability of the coating film can be improved. When the acceleration voltage is high and exceeds 500 kV, the flexibility and processability of the coating film cannot be balanced easily, whereas when the acceleration voltage is too low, such as less than 30 kV, a curing failure occurs, preventing the expression of the gloss retentivity and staining resistance of the coating film. The exposure dose is preferably about 5–200 kGy, more preferably 10–100 kGy. When the exposure dose is too low, such as less than 5 kGy, the curing becomes insufficient, whereas when it is high and exceeds 200 kGy, the flexibility of the coating film could be impaired.

The coating composition of the present invention can be also used as a hard coat agent to form a hard coat layer on the surface of plastic articles such as optical products (e.g., various plastic films, plastic lenses and the like), recording materials (e.g., CD, MD and the like), wind shield of airplanes, windows of vehicles and the like. Particularly, since a hard coat agent is required to have properties of solvent resistance, chemical resistance, abrasion resistance, wear resistance and the like, these are promising application targets besides a coating object for the coating composition.

When the coating composition of the present invention is used as a hard coat agent, the materials and methods described in JP-B-60-21628, JP-A-52-16586, JP-B-55-15494, JP-B-51-24368, JP-A-52-112698, JP-A-60-45201, JP-A-5-19102 and the like can be used. Moreover, the coating composition of the present invention can be preferably applied to use that requires particularly high surface gloss and superior gloss retentivity and staining resistance, such as for FRP products (e.g., a bumper and the like), and the surface of a marble table, railings of a chair made of wooden material and the like.

EXAMPLES

The present invention is explained in detail in the following by way of Examples, which do not limit the present invention. In Examples, coating compositions were prepared using each unsaturated urethane compound, and applied to a coating object, and gloss retentivity and staining resistance and cracks of the coating film, and warpage and adhesiveness of a floor material were evaluated.

The components used in Examples are shown in the following.

NK ester A-TMM-3L and NK ester 701A are produced by Shin-Nakamura Chemical Co., Ltd. and are a mixture of tetramethylolmethane triacrylate (54–56%) and tetramethylolmethane tetraacrylate (39–41%) (Mw: 298, OHV (mg KOH/g): 110), and 1-acryloyl-2-hydroxy-3-methacryloylpropane (Mw: 214, OHV (mg KOH/g): 262), respectively. NK ester ABE300 (Mw: 468) is produced by Shin-Nakamura Chemical Co, Ltd. Blendmer AE200 (Mw: 257, OHV (mg KOH/g): 218), blendmer AE-350 (Mw: 438, OHV (mg KOH/g): 104), blendmer AP-550 (Mw: 632, OHV (mg KOH/g): 89), blendmer 55PET-800 (Mw: 850, OHV (mg KOH/g): 66), blendmer 50PPT800 (Mw: 800, OHV (mg KOH/g): 70) and blendmer 70PEP-500 (Mw: 500, OHV (mg KOH/g): 112) are all produced by NOF Corporation, and chemical structures of these blendmers and NK ester ABE300 are shown in the following. OHV (mg KOH/g) described herein refers to the hydroxyl value of each polyol compound.

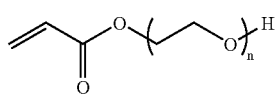

n=4: blendmer AE-200
n=8: blendmer AE-350

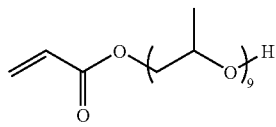

blendmer AP-550

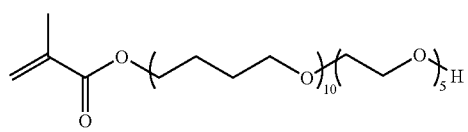

blendmer 55PET-800

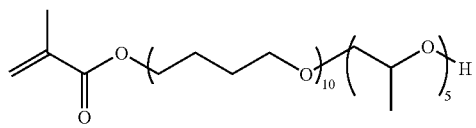

blendmer 50PPT-800

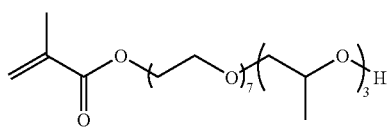

blendmer 70PEP-500

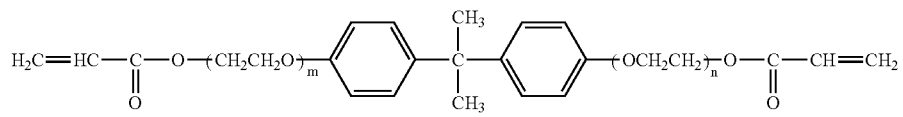

NK ester ABE300 (n+m=3)

Duranate TPA-100 is produced by Asahi Chemical Industry Co., Ltd. and is tris(6-isocyanatohexyl)isocyanurate (Mw: 504).

Example 1

To a four-neck flask equipped with a thermometer, a condenser, a stirrer and an inert gas inlet were charged NK ester A-TMM-3L (253 g), blendmer AE350 (44 g), Duranate TPA-100 (100 g), hydroquinone (0.1 g) and dibutyltin laurate (0.07 g). The mixture was reacted for 8 hours at 80° C. Infrared spectra of the reaction mixture were taken and the reaction was stopped when the absorption peak of isocyanato group (2170 cm$^{-1}$) disappeared.

A coating composition containing the unsaturated urethane compound obtained above was prepared according to the following method. While emulsifying in a homomixer (IKA; T25 Basic), the unsaturated urethane compound obtained above was gradually added to distilled water containing an emulsifier until the unsaturated urethane compound content became 40 wt %. A UV curing agent, Darocure 1173 (2 wt %, Ciba Specialty Chemicals), was added to give an aqueous emulsion coating composition.

Lastly, the aqueous emulsion coating composition obtained above was applied to INLAID ERDE (TAKIRON Co., Ltd.), which is a vinyl floor tile, with a roller (Aozora, Ohtsuka Brush Mfg. Co., Ltd.), such that the film thickness after drying was 20 μm. The coated material was stood for 1 hr at 20° C. to allow evaporation of the solvent in the coating film. The solvent in the coating film was evaporated and the film was exposed to the light of irradiation quantity 420 mJ/cm$^2$ from a high-pressure mercury lamp (H05-L21; manufactured by EYE GRAPHICS CO., LTD.) to give a coating composition-coated material, which consisted of a film made from the coating composition and the vinyl floor tile.

Examples 2–9 and Reference examples 1–9

First, unsaturated urethane compounds were produced in the same manner as in Example 1 using the starting materials in quantities listed in Tables 1 and 2. The unit of the numeric values in Tables 1 and 2 is parts by weight.

TABLE 1

Formurations of unsaturated urethane compounds

| Constituent | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| NK ester A-TMM-3L | 253 | 295 | 295 | 295 | 295 | 295 | 253 | 253 | 227 |
| blendmer AE-350 | 44 | | | | | | | | 66 |
| blendmer AP-550 | | 38 | | | | | 63 | | |
| blendmer 55PET-800 | | | 51 | | | | | | |
| blendmer 50PPT-800 | | | | 48 | | | | | |
| blendmer 70PEP-500 | | | | | 30 | | | 50 | |
| blendmer AE-200 | | | | | | 15.4 | | | |
| Duranate TPA-100 | 100 | 105.2 | 105.2 | 105.2 | 105.2 | 105.2 | 100 | 100 | 100 |
| hydroquinone | 0.1 | 0.1 | 0.1 | 0.1 | 0.1 | 0.1 | 0.1 | 0.1 | 0.1 |
| dibutyltin laurate | 0.07 | 0.07 | 0.07 | 0.07 | 0.07 | 0.07 | 0.07 | 0.07 | 0.07 |

TABLE 2

Formurations of unsaturated urethane compounds

| Constituent | Ref. ex. 1 | Ref. ex. 2 | Ref. ex. 3 | Ref. ex. 4 | Ref. ex. 5 | Ref. ex. 6 | Ref. ex. 7 | Ref. ex. 8 | Ref. ex. 9 |
|---|---|---|---|---|---|---|---|---|---|
| NK ester A-TMM-3L | 253 | 253 | 227 | 227 | 50.1 | 220 | 328 | | |
| NK ester 701A | | | | | | | | 214 | 107 |
| blendmer AE-350 | | | | | 108.4 | 100 | | | |
| blendmer AP-550 | | | 95 | | | | | | |
| blendmer 55PET-800 | 85 | | | 128 | | | | | |
| blendmer 50PPT-800 | | 80 | | | | | | | |
| 2-hydroxyethyl acrylate | | | | | | | | 58 | 116 |
| Duranate TPA-100 | 100 | 100 | 100 | 100 | 50.4 | 105.2 | 91 | 252 | 252 |
| hydroquinone | 0.1 | 0.1 | 0.1 | 0.1 | 0.1 | 0.1 | 0.1 | 0.1 | 0.1 |
| dibutyltin laurate | 0.07 | 0.07 | 0.07 | 0.07 | 0.07 | 0.07 | 0.07 | 0.07 | 0.07 |

Then, the obtained unsaturated urethane compounds were used to prepare respective coating compositions in the same manner as in Example 1. Finally, coating composition-coated materials were obtained in the same manner as in Example 1.

The proportion of the number of unsaturated bonds, the content and the kind of poly(alkyleneoxy) group in Examples 1–9 and Reference examples 1–9 obtained above are shown in Table 3, wherein EO is poly(ethyleneoxy) group, PO is poly(propyleneoxy) group, EO-PO is poly(ethyleneoxy)-poly(propyleneoxy) group, EO-TMO is poly(ethyleneoxy)-poly(tetramethyleneoxy) group, and PO-TMO is poly(propyleneoxy)-poly(tetramethyleneoxy) group.

TABLE 3

Properties of coating compositions

| Ex. No. and Ref. ex. No. | Proportion of the number of unsaturated bonds | poly(alkyleneoxy) group content (wt %) | kind |
|---|---|---|---|
| Exs. 1 and 10 | 8.1 | 8.8 | EO |
| Ex. 2 | 8.4 | 7.6 | PO |
| Ex. 3 | 8.4 | 10.4 | EO-TMO |
| Ex. 4 | 8.4 | 9.4 | PO-TMO |
| Ex. 5 | 8.4 | 6.1 | EO-PO |
| Ex. 6 | 8.4 | 2.5 | EO |
| Ex. 7 | 8.0 | 13.3 | PO |
| Ex. 8 | 8.0 | 10.8 | EO-PO |
| Ex. 9 | 7.7 | 13.4 | EO |
| Ref. ex. 1 | 8.0 | 17.8 | EO-PO |
| Ref. ex. 2 | 8.0 | 16.2 | PO-TMO |
| Ref. ex. 3 | 7.5 | 19.8 | PO |
| Ref. ex. 4 | 7.5 | 25.9 | EO-PO |
| Ref. ex. 5 | 5.0 | 41.5 | EO |
| Ref. ex. 6 | 7.2 | 18.8 | EO |
| Ref. ex. 7 | 9.0 | 0 | — |
| Ref. ex. 8 | 5.0 | 0 | — |
| Ref. ex. 9 | 4.0 | 0 | — |

The structural formulas of the unsaturated urethane compounds mainly obtained in Examples 1–9 and Reference examples 1–9 are shown in the following.

Examples 1, 9 and Reference example 6

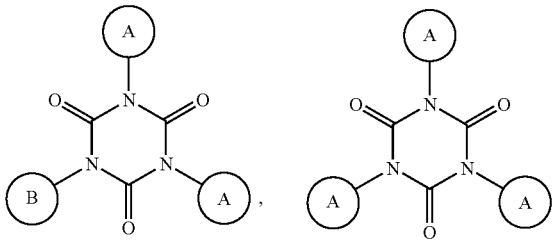

Reference example 5

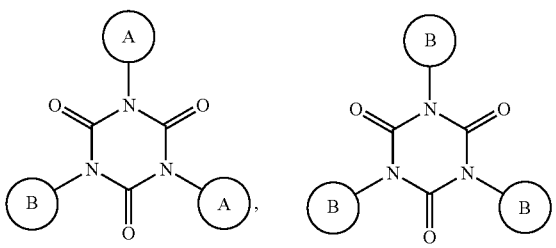

Examples 2, 7 and Reference example 3
Example 6
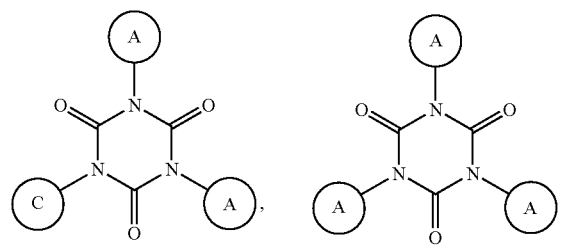
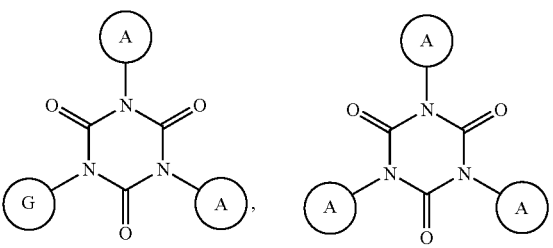
Example 3 and Reference example 1, 4
Reference example 7
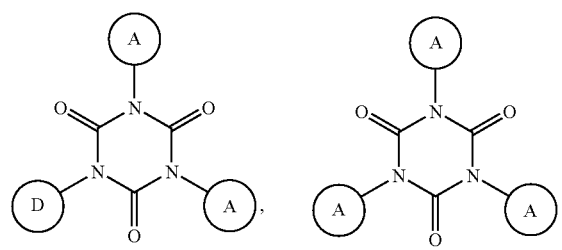
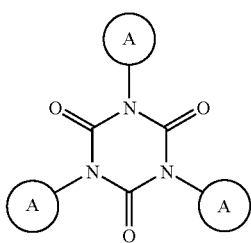
Example 4 and Reference example 2
Reference example 8
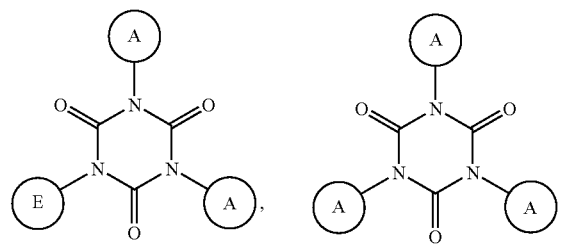
Examples 5, 8
Reference example 9
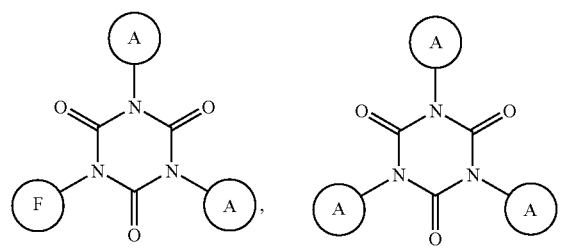
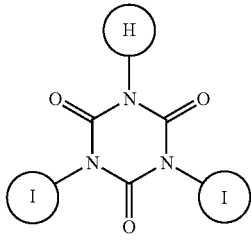

wherein,

A is $-(CH_2)_6NHCO_2CH_2C(CH_2OCCH=CH_2)_3$, with a C=O on the central carbon,

B is $-(CH_2)_6NHCO(OCH_2CH_2)_8OCCH=CH_2$, with C=O,

C is $-(CH_2)_6NHCO(OCHCH_2)_9OCCH=CH_2$, with $CH_3$ branch and C=O,

D is $-(CH_2)_6NHCO(OCH_2CH_2)_5(OCH_2CH_2CH_2CH_2)_{10}OCCH=CH_2$, with $OCH_3$ substituent, E is $-(CH_2)_6NHCO(OCHCH_2)_5(OCH_2CH_2CH_2CH_2)_{10}OCCH=CH_2$, with $CH_3$ and $OCH_3$ substituents, F is $-(CH_2)_6NHCO(OCHCH_2)_3OCH_2CH_2)_7OCCH=CH_2$, with $CH_3$ and $OCH_3$ substituents, G is $-(CH_2)_6NHCO(OCH_2CH_2)_4OCCH=CH_2$, with C=O, H is $-(CH_2)_6NHCO_2CH-CH_2OCC=CH_2$, with $OCH_3$ substituent and a branch $CH_2OCCH=CH_2$ with C=O, I is $-(CH_2)_6NHCO_2CH_2CH_2CH_2CH_2OCCH=CH_2$, with C=O

Example 10

The unsaturated urethane compound (36 parts by weight) obtained in Example 1 was mixed with NK ester ABE300 (4 parts by weight). Using a homomixer (IKA; T25 Basic), the mixture was gradually added to distilled water containing an emulsifier until the content of the mixture became 40 wt %, and emulsification was completed. Darocure 1173 (2 wt %, Ciba Specialty Chemicals) as a UV curing agent was added thereto to give an aqueous emulsion coating composition.

Finally, the aqueous emulsion coating composition obtained above was applied to INLAID ERDE (TAKIRON Co., Ltd.), which is a vinyl floor tile, with a roller (Aozora, Ohtsuka Brush Mfg. Co., Ltd.), such that the film thickness after drying was 20 µm. The coated material was stood for 1 hr at 20° C. to allow evaporation of the solvent in the film. The film was exposed to the light of irradiation quantity 420 m J/cm² to give a coating composition-coated material, which had a film made from the coating composition formed on the vinyl floor tile.

Evaluation Method of Gloss Retentivity (Difference in Surface Glossiness)

The gloss retentivities of the coated films obtained in Examples 1–10 and Reference examples 1–9 was evaluated according to the following method. A 1200 g/cm² square metal mass was placed on the surface of the coating film via quartz sand No. 8 and the metal mass was reciprocated 40 times. The surface glossiness before and after the test was measured with a gloss checker (trademark IG-330; HORIBA, Ltd.) and the gloss retentivity was evaluated by the difference in the surface glossiness. The surface glossiness before the test was 80±5 for every film. The results are shown in Table 4. The smaller the difference in the surface glossiness, the more superior the surface gloss retentivity of the film. When the difference in the surface glossiness was not more than 35 (good in overall evaluation), preferably not more than 32, the film can be considered to have superior gloss retentivity. The difference in the surface glossiness before and after the 40 reciprocations of the metal mass corresponds to that in the surface glossiness of a floor material before and after leaving the material in heavy foot traffic for 3 months. When the difference in the surface glossiness exceeded 35, the film was evaluated as a fail in the overall evaluation.

Evaluation Method of Staining Resistance

The staining resistance of the coating films obtained in Examples 1–10 and Reference examples 1–9 was evaluated according to the following method using red aqueous ink (PILOT ink; PILOT Corporation), sodium hydroxide (5 wt %) and oil-based black ink (oil-based Magic ink No. 500). The above-mentioned pollutants were applied to the surface. The stained area was covered with a watch glass, and the film was stood for 3 hr at room temperature. The watch glass was then removed and the surface was washed with tap water. When the oil-based black ink was applied, moreover, the area was wiped with a waste impregnated with petroleum benzine. The staining resistance was evaluated in accordance with the following criteria. The results are shown in Table 4.

○: no trace (good in overall evaluation)

Δ: slight trace (poor in overall evaluation)

X: clear trace (failure in overall evaluation)

The coating film of the present invention allowed removal of the stain by a simple method, such as washing with tap water and wiping with a waste.

Evaluation Method of Warpage of Coating Object

To a vinyl floor tile (INLAID ERDE) was applied a floor coating composition (aqueous emulsion), such that the film thickness after drying was 20 μm. The warpage of a corner of the tile immediately after W irradiation (irradiation quantity 2.7 J/cm$^2$) was evaluated. When the warpage of the coating object (floor material) was 4 mm or less, the floor coating composition could be considered suitable. In the overall evaluation, 4 mm or less of the warpage was good, that above 4 mm was poor, and that of 5 mm or above was a failure. The results are shown in Table 4.

Evaluation Method of Adhesiveness

The coating films obtained in Examples 1–10 and Reference examples 1–9 were subjected to 2 mm width cross cut test using Sellotape (Nichiban Co., Ltd.), wherein the film was cut with a cutter into twenty-five 2 mm-square pieces by making 6 vertical and 6 horizontal gaps at 2 mm intervals, Sellotape was adhered thereon and the Sellotape was peeled off at an angle of 45° C. with the coating film, and the number of exfoliated pieces was counted to evaluate the adhesiveness. Therein, 25/25 means that no piece came off from the 25 pieces and 0/25 means that all pieces were exfoliated. In the overall evaluation, 25/25 was good and less than 25/25 was a failure. The obtained results are shown in Table 4.

Evaluation Method of Cracks of Coating Film

To a vinyl floor tile adhered to a polyester veneer was applied the floor coating composition, such that the film thickness after drying was 20 μm. After drying for 1 hr at room temperature, the film was exposed to UV irradiation (irradiation quantity 2.7 J/cm$^2$), at which the film was observed. The results are shown in Table 4.

○: no cracks in the film (good in overall evaluation).

X: cracks in the film (failure in overall evaluation).

Method for Overall Evaluation

Based on the respective properties obtained above, the coating composition-coated material was evaluation in total. The obtained results are shown in Table 4.

○: good in all test items

Δ: poor in a part of test items

X: test items are partly failure

TABLE 4

| | | Properties of coated materials | | | | | | |
|---|---|---|---|---|---|---|---|---|
| Ex. and | gloss retentivity | staining resistance | | | cracks | Adhesive- | warpage of | |
| Ref. ex No. | (difference in surface glossiness) | aqueous red ink | oil-based black ink | Sodium hydroxide | of film | ness of film | coating object | overall evaluation |
| Ex. 1 | 26 | ○ | ○ | ○ | ○ | 25/25 | 4 | ○ |
| Ex. 2 | 30 | ○ | ○ | ○ | ○ | 25/25 | 2 | ○ |
| Ex. 3 | 31 | ○ | ○ | ○ | ○ | 25/25 | 3 | ○ |
| Ex. 4 | 32 | ○ | ○ | ○ | ○ | 25/25 | 3 | ○ |
| Ex. 5 | 27 | ○ | ○ | ○ | ○ | 25/25 | 3 | ○ |
| Ex. 6 | 26 | ○ | ○ | ○ | ○ | 25/25 | 3 | ○ |
| Ex. 7 | 23 | ○ | ○ | ○ | ○ | 25/25 | 3 | ○ |
| Ex. 8 | 20 | ○ | ○ | ○ | ○ | 25/25 | 4 | ○ |
| Ex. 9 | 21 | ○ | ○ | ○ | ○ | 25/25 | 3 | ○ |
| Ex. 10 | 27 | ○ | ○ | ○ | ○ | 25/25 | 3 | ○ |
| Ref. ex. 1 | 36 | Δ | ○ | ○ | ○ | 25/25 | 3 | X |
| Ref. ex. 2 | 32 | Δ | ○ | ○ | ○ | 25/25 | 3 | Δ |
| Ref. ex. 3 | 32 | Δ | ○ | ○ | ○ | 25/25 | 2 | Δ |
| Ref. ex. 4 | 23 | X | ○ | ○ | ○ | 25/25 | 2 | X |
| Ref. ex. 5 | 42 | X | ○ | X | ○ | 25/25 | 1 | X |
| Ref. ex. 6 | 36 | X | ○ | X | ○ | 25/25 | 1 | X |
| Ref. ex. 7 | 23 | ○ | ○ | ○ | ○ | 25/25 | 5 | X |
| Ref. ex. 8 | 31 | X | X | ○ | ○ | 25/25 | 1 | X |
| Ref. ex. 9 | 30 | X | X | ○ | ○ | 25/25 | 1 | X |

As stated above, the floor coating composition of the present invention permits use of water as a solvent, and can form a coating film superior in gloss retentivity and staining resistance against powerful staining substances, that permits easy removal of damages and color stain by a method such as polishing and the like. Therefore, the floor coating composition of the present invention can provide a coating composition-coated material aiming at decoration and protection, which material is superior in gloss retentivity and staining resistance, and which makes daily maintenance management easy. Moreover, the coating composition-coated material of the present invention can suppress warpage of coating objects (floor, floor material, plastic film and the like) and cracks in the coating film. The floor coating composition of the present invention can be applied to various floor materials such as plastics, wood, ceramics, stone, concrete, metal and the like.

The easy polishing away of damages and color stain of a coating film made from the floor coating composition of the present invention (for example, by polishing with a compound containing a polisher etc.) can be afforded because damages and color stains do not penetrate deep into the film but stay in the surface layer, which makes a refreshing work of the surface of a floor material feasible. In accordance with the present invention, exfoliations and damages in the coating film can be repaired and a coating film can be formed in layers.

With the floor coating composition of the present invention, routine floor cleaning can be done by a very easy method (for example, with duster cloth, dust brush, vacuum cleaner, by wiping with a mop using water or neutral detergents, and the like), whereby the stains adhered to the surface of a coating film can be removed. In other words, the use of the coating composition of the present invention can drastically reduce the total cost of floor maintenance, inclusive of daily maintenance management expenses.

This application is based on patent application Nos. 180093/2000 and 296173/2000 filed in Japan, the contents of which are all incorporated herein.

What is claimed is:

1. A floor coating composition comprising one or more unsaturated urethane compound(s), which is(are) obtained from an isocyanate compound(s) and a hydroxyl compound(s) as starting materials, wherein at least one of the isocyanate compound(s) and the hydroxyl compound(s) has an unsaturated bond(s), which composition characteristically satisfies the following conditions (1) and (2):

(1) at least one of the unsaturated urethane compounds has a poly(alkyleneoxy) group(s) derived from the above-mentioned isocyanate compound and/or hydroxyl compound in a proportion of not less than 2 wt % and not more than 16 wt % of the total amount of the isocyanate compound(s) and the hydroxyl compound(s) used for the unsaturated urethane compound(s), and (2) the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of isocyanato group of the isocyanate compound(s) is not less than 6, or the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of hydroxyl group of the hydroxyl compound(s) is not less than 6.

2. The floor coating composition of claim 1, wherein the (2) is the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of isocyanato group of the isocyanate compound(s), which is not less than 6.

3. The floor coating composition of claim 2, wherein the number of the isocyanato groups of the isocyanate compound(s) is not less than 3.

4. The floor coating composition of claim 3, wherein the isocyanate compound is a tris(isocyanatoalkyl)-substituted isocyanurate compound.

5. The floor coating composition of claim 2, wherein the hydroxyl compound has unsaturated bond(s).

6. The floor coating composition of claim 1, wherein the (2) is the value obtained by multiplying the number of moles of each starting material having the unsaturated bond(s) by the number of the unsaturated bond(s) thereof, adding up the obtained values of the starting materials, dividing the resulting value by the total of the number of moles of the starting materials having the unsaturated bond(s) and multiplying the obtained value by the number of hydroxyl group of the hydroxyl compound(s), which is not less than 6.

7. The floor coating composition of claim 6, wherein the number of the hydroxyl groups of the hydroxyl compound(s) is not less than 3.

8. The floor coating composition of claim 6, wherein the isocyanate compound has unsaturated bond(s).

9. The floor coating composition of claim 1, wherein the unsaturated urethane compound has at least one group selected from the group consisting of an acryloyl group, a methacryloyl group and an allyl group.

10. The floor coating composition of claim 1, wherein the poly(alkyleneoxy) group is one or more group(s) selected from the group consisting of a poly(ethyleneoxy) group, a poly(propyleneoxy) group and a poly(tetramethyleneoxy) group.

11. The floor coating composition of claim 1, further comprising a curing agent.

12. The floor coating composition of claim 1, further comprising a poly(alkyleneoxy) group-containing epoxy resin.

13. The floor coating composition of claim 12, wherein the content of the poly(alkyleneoxy) group-containing epoxy resin is not more than 30 wt % of the total solid content.

14. The floor coating composition of claim 1, which is of an aqueous emulsion system or an aqueous dispersion system.

15. A coating composition-coated material, which comprises a film made by curing the floor coating composition of claim 1 and a coating object to be coated.

16. The material of claim 15, wherein the coating object to be coated is a floor material or a plastic film.

17. The material of claim 15, which is cured by one or more method(s) selected from the group consisting of heating, photoirradiation and electron beam irradiation.

* * * * *